Figure 1:
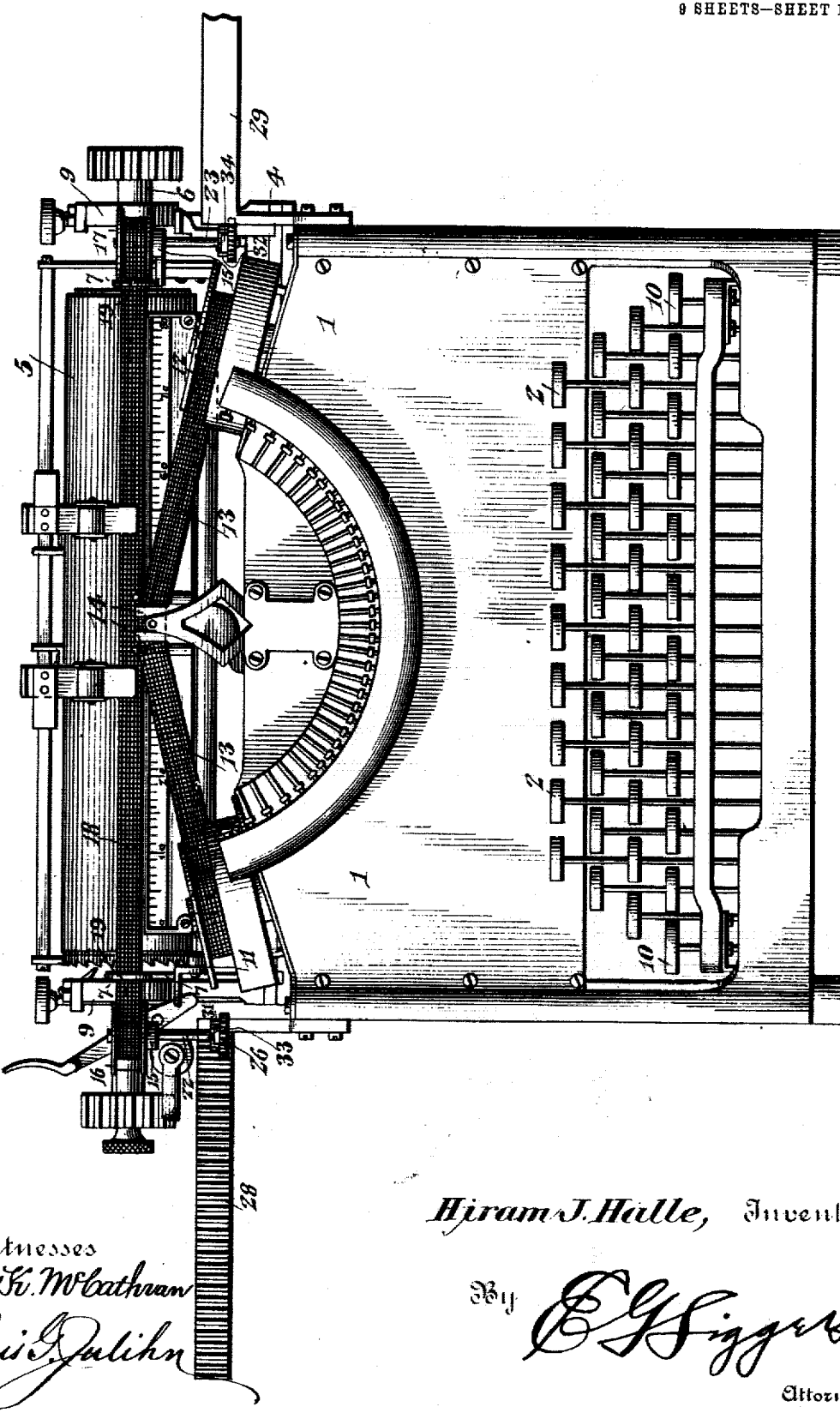

No. 825,457. PATENTED JULY 10, 1906.
H. J. HALLE.
MANIFOLDING RIBBON MECHANISM FOR TYPE WRITING MACHINES.
APPLICATION FILED MAY 16, 1905.
9 SHEETS—SHEET 1.

Hiram J. Halle, Inventor

Witnesses
Jas. K. McCathran
Louis J. Julihn

By E. G. Siggers
Attorney

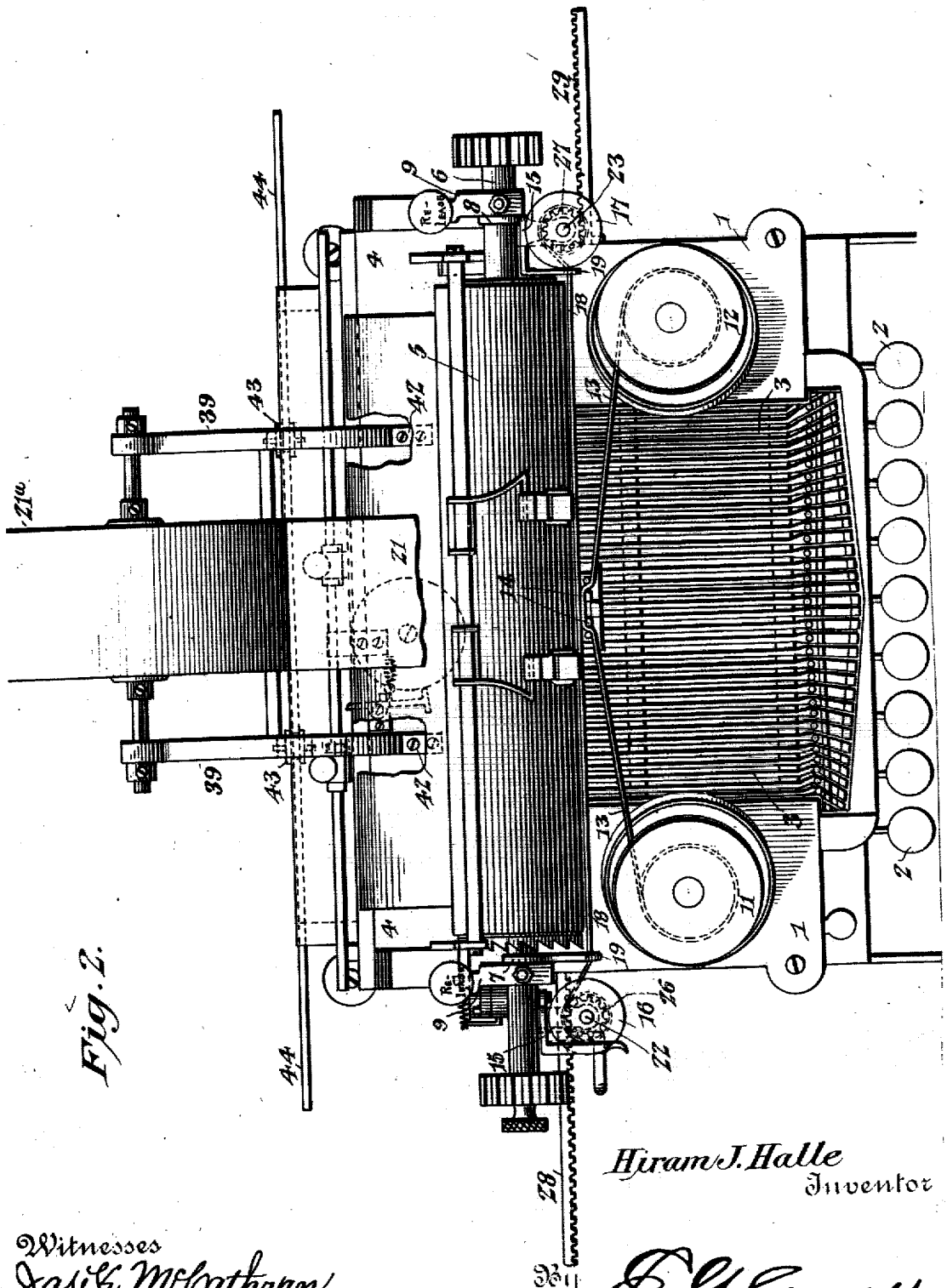

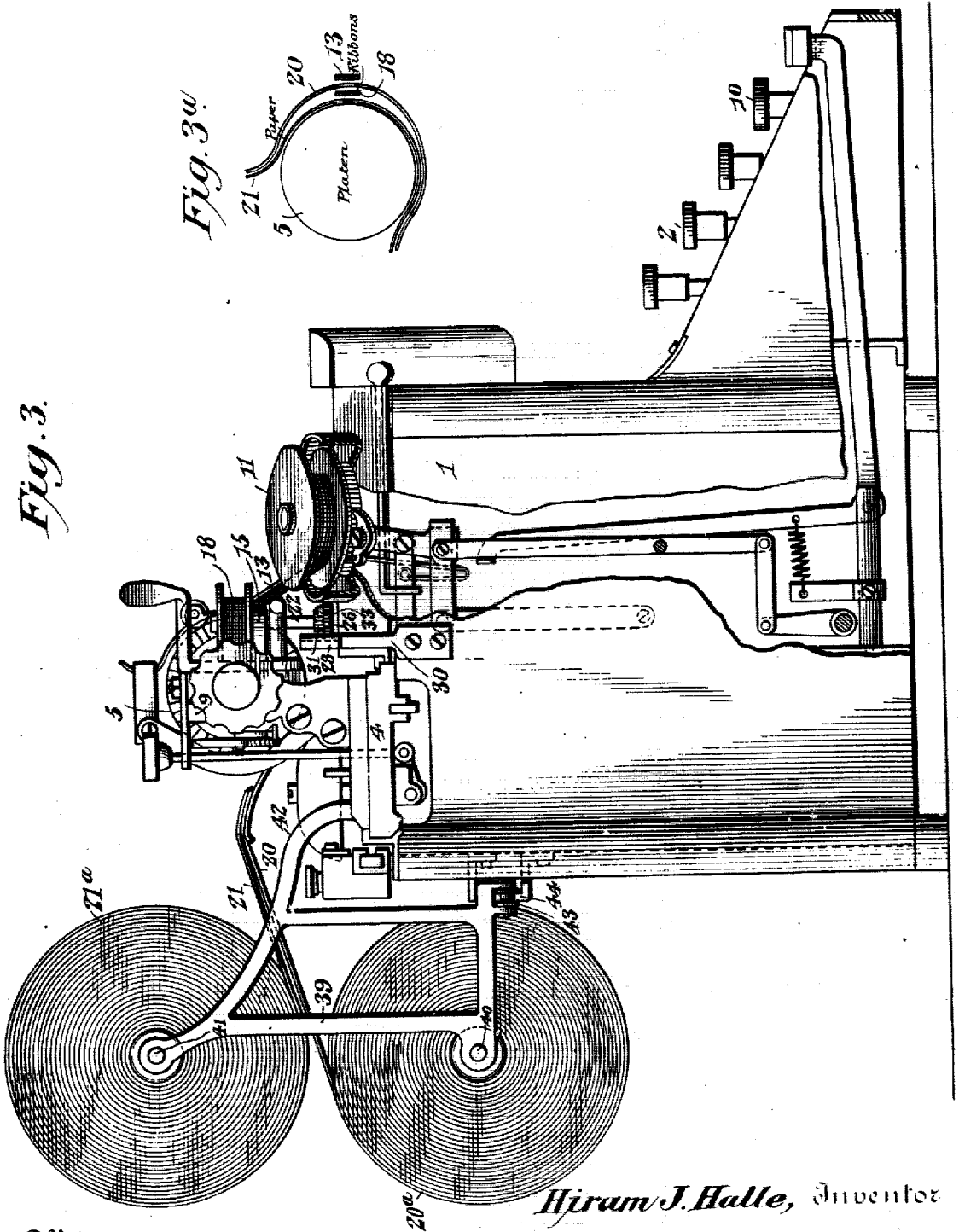

No. 825,457. PATENTED JULY 10, 1906.
H. J. HALLE.
MANIFOLDING RIBBON MECHANISM FOR TYPE WRITING MACHINES.
APPLICATION FILED MAY 16, 1905.
9 SHEETS—SHEET 4.
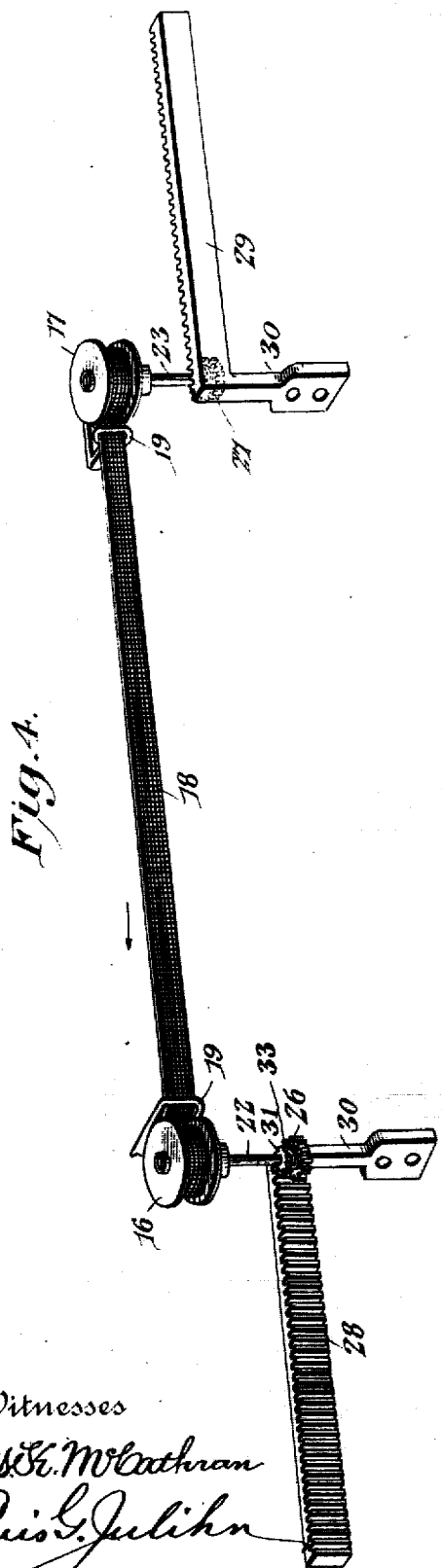
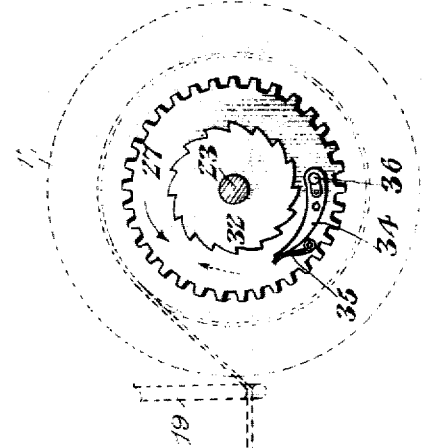
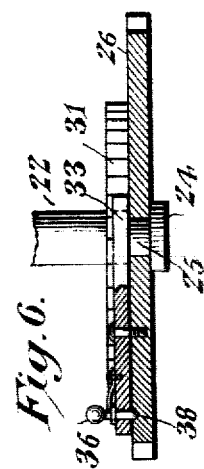
Hiram J. Halle, Inventor

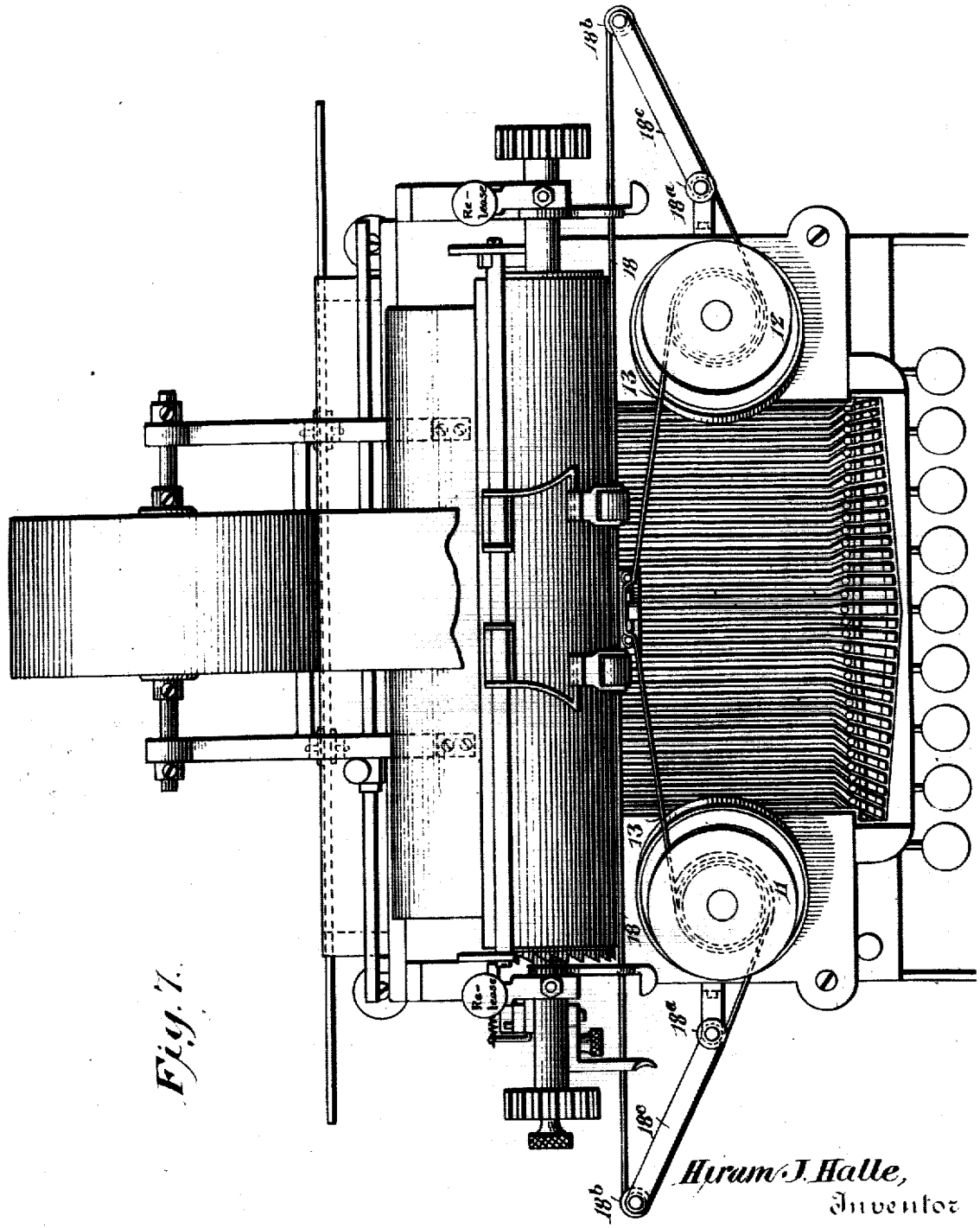

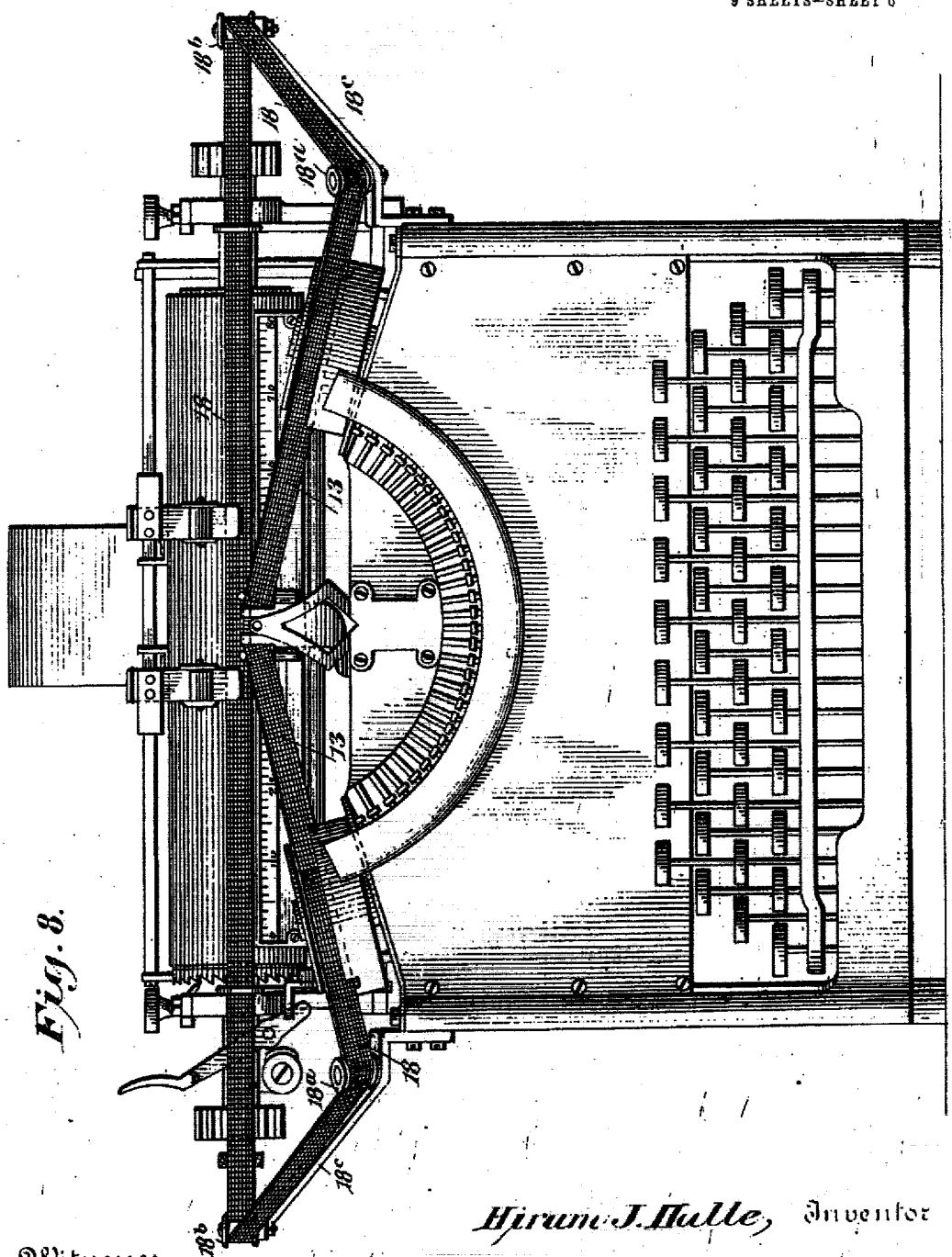

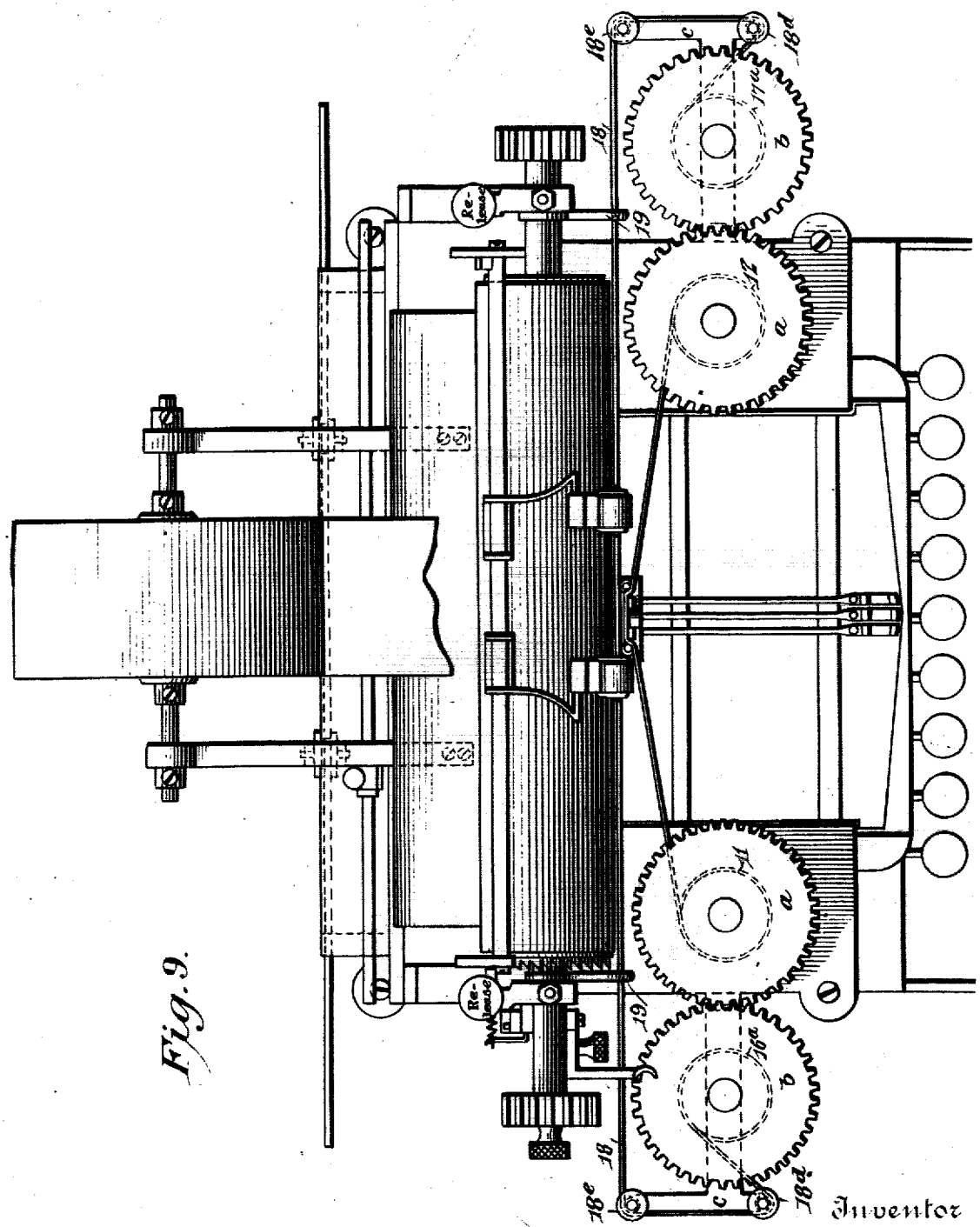

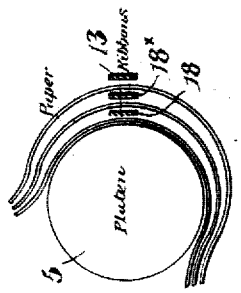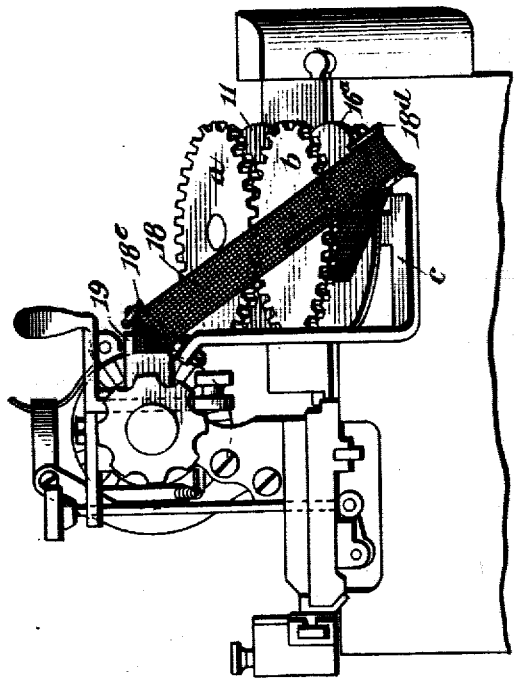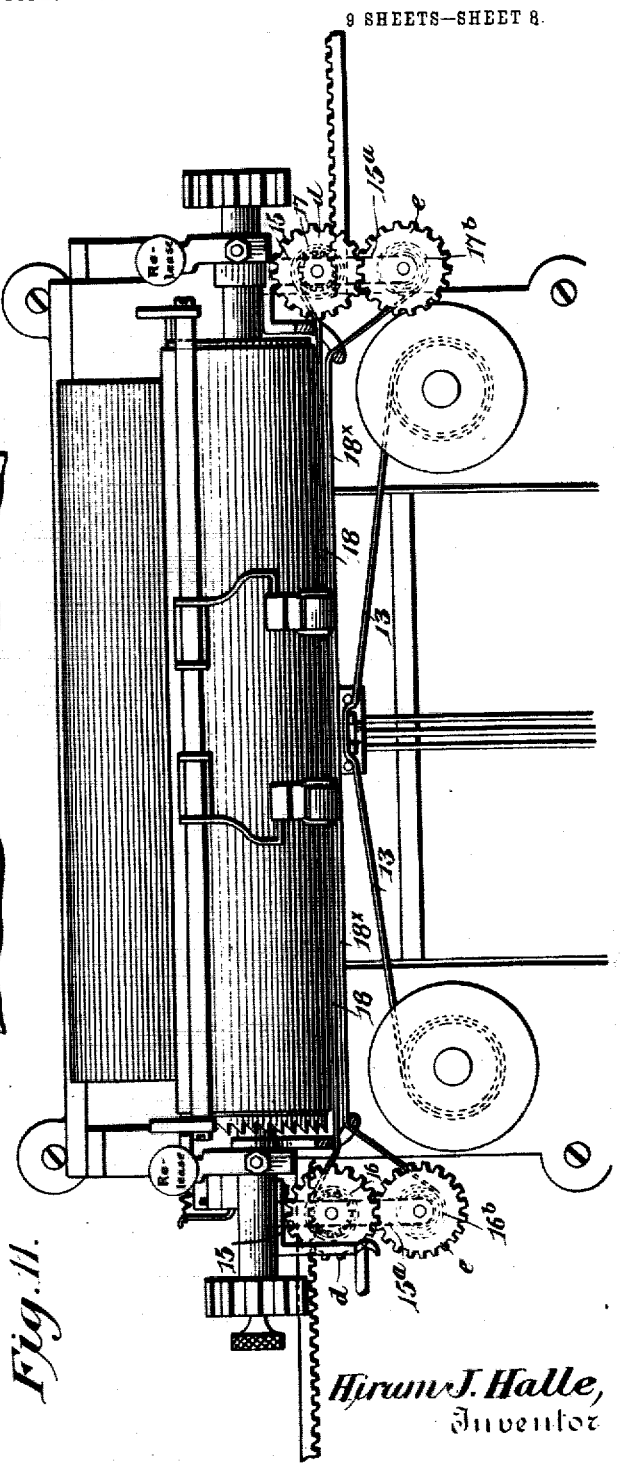

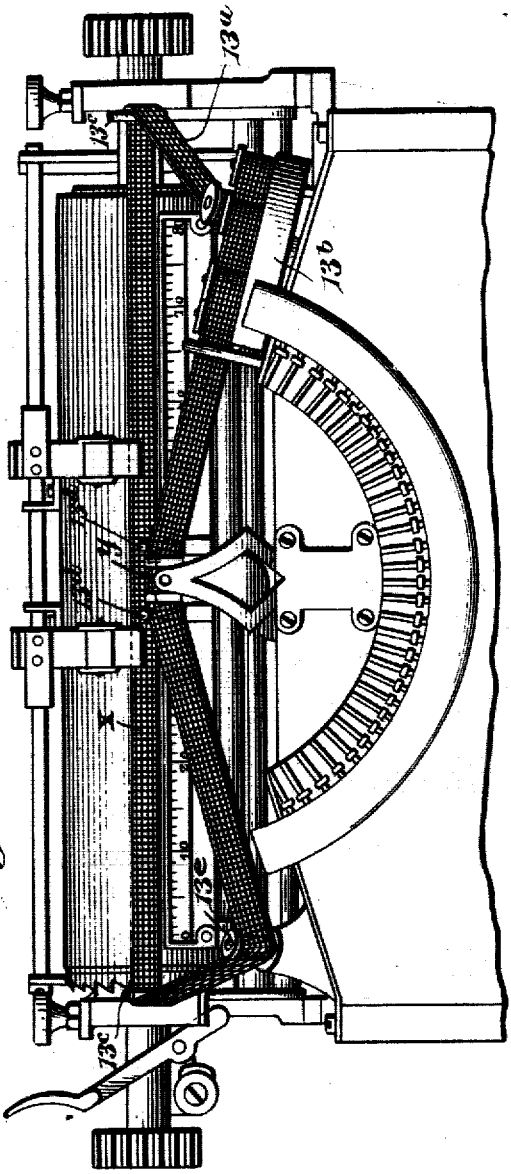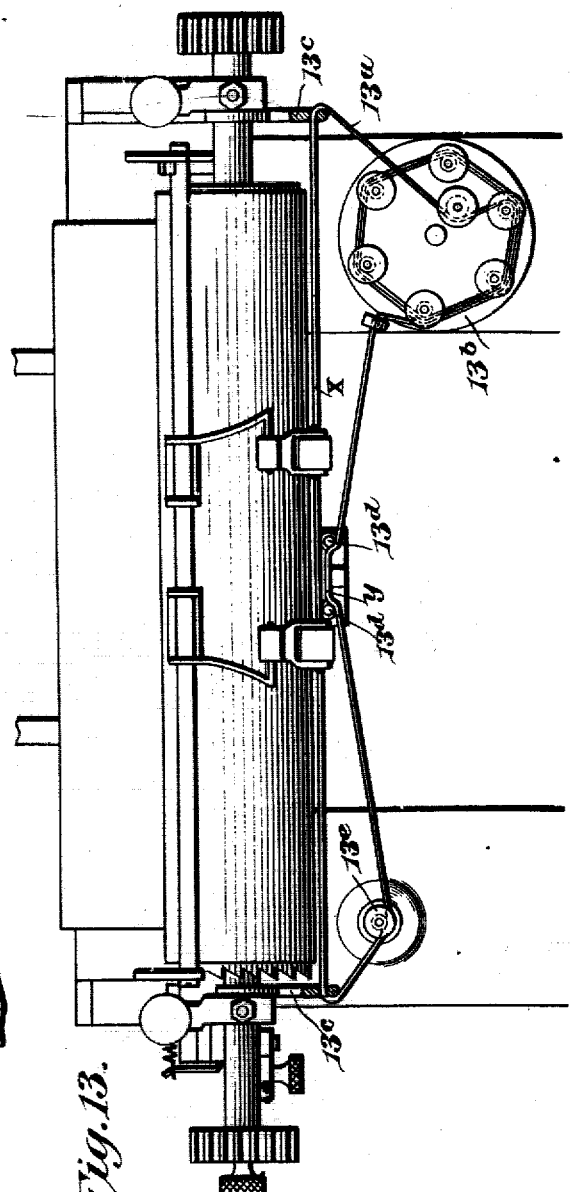

UNITED STATES PATENT OFFICE.

HIRAM J. HALLE, OF NEW YORK, N. Y., ASSIGNOR TO ELLIOTT-FISHER COMPANY, OF NEW YORK, N. Y., A CORPORATION OF DELAWARE.

MANIFOLDING-RIBBON MECHANISM FOR TYPE-WRITING MACHINES.

No. 825,457.　　　Specification of Letters Patent.　　　Patented July 10, 1906.

Application filed May 16, 1905. Serial No. 260,685.

To all whom it may concern:

Be it known that I, HIRAM J. HALLE, a citizen of the United States, residing at New York, in the county of New York and State of New York, have invented a new and useful Manifolding-Ribbon Mechanism for Type-Writing Machines, of which the following is a specification.

This invention relates to a manifolding-ribbon mechanism which though capable of use in other relations is especially designed for the equipment of type-writing machines of the visible-writing round-platen type.

The object of the invention, stated broadly, is to provide a type-writing machine with a ribbon or ribbons arranged to facilitate the production of manifold-records without necessity for the use of loose carbon or transfer sheets.

Stated more specifically, the principal object is to equip a machine of the visible-writing type with one or more ribbons arranged in a novel manner to permit a plurality of paper webs or sheets to be interwoven or disposed in alternation with a plurality of ribbon-sections, whether of the same or different ribbons, located in the plane of the line of writing during the printing operation to simultaneously produce upon the paper strips or sheets a plurality of impressions or records of the character printed.

Another object is to provide for the automatic feeding of the ribbon or ribbons to present fresh or unused portions thereof opposite the printing-point.

Another object is to mount one or more of the ribbons for bodily movement with the platen and paper and to provide for the feeding of such ribbon or ribbons during the retraction of the carriage, the movement of the platen toward the left during the writing operation serving to move the ribbon step by step past the printing-point and the retraction of the platen serving to wind a considerable portion of the ribbon from one spool to another to present a different portion of the ribbon opposite the platen.

A further object is to provide a manifolding-ribbon mechanism comprising a set of ribbons mounted in part on the carriage and in part on the frame, the part on the frame being fed step by step from spool to spool as the carriage advances and the part on the carriage being fed from spool to spool as the carriage is retracted to begin a new line of writing.

Another object of the invention is to mount a ribbon not only on the carriage for movement with the latter in its travels back and forth in the direction of letter-spacing, but also for movement with the platen as the latter is shifted on the carriage to change the case, thus permitting the ribbon and the two paper sheets between which it is interposed to remain in relatively fixed relation during the printing of a line including both upper and lower case characters.

Subordinate to the several objects recited are others, which will appear more fully as the succeeding description of the illustrated embodiment of the invention is developed.

In the accompanying drawings, Figure 1 is a front elevation of a type-writing machine equipped with manifolding-ribbon mechanism in accordance with my invention. Fig. 2 is a plan view thereof with parts broken away. Fig. 3 is a side elevation of the machine with a portion of the casing broken away to show the key-operated feeding mechanism for one of the ribbons. Fig. 3ª is a diagrammatic view of the platen, paper webs, and ribbons shown in Fig. 3. Fig. 4 is a detail perspective view showing what may be termed the "secondary" ribbon and the mechanism for effecting the feeding thereof from spool to spool during the retraction of the carriage. Fig. 5 is a detail view showing the feed-shafts, pinions, ratchets, and pawls in full lines and indicating the positions of the spools, the secondary ribbon, and the guides in dotted lines. Fig. 6 is a detail sectional elevation showing the relation of a spool-shaft and the associated pinion and ratchet. Fig. 7 is a plan view of the machine equipped with two ribbons, both mounted on the machine-frame and wound upon the same spools. Fig. 8 is a front elevation of the machine equipped as shown in Fig. 7. Fig. 9 is a plan view of a further variation of the ribbon mechanism, showing both ribbons mounted on the frame, but wound upon different spools, both sets of spools being geared together and arranged to be operated from the keys. Fig. 10 is a side elevation of the upper portion of the machine equipped as in Fig. 9; and Fig. 11 is a plan view of a still further variation, consisting in the employment of one ribbon extending between spools mounted on the frame and two additional ribbons mounted on separate sets of spools movable with the platen-carriage and geared together. Fig. 11ª is a diagrammatic view of the platen, paper webs, and ribbons shown in Fig. 11; and Figs. 12 and 13 are a front elevation and a plan view, respectively, showing an endless ribbon arranged to have separate parts or sections thereof arranged opposite one another in the plane of the line of writing.

Each part, wherever shown, is designated by its appropriate reference character.

1 indicates the frame or casing of a typewriting machine, 2 the keys, and 3 the type-bars operated by the keys by intermediate connections with which my present invention has no concern.

4 indicates the paper-carriage guided in suitable ways adjacent to the upper rear corner of the frame 1 and designed to be advanced step by step to the left by carriage-propelling mechanism controlled by a key-operated escapement, as is usual in this type of machines. The shaft 6 of the platen 5 is journaled in bearings 7 and 8, which are connected to form a platen-frame and are vertically movable in upright guides 9, rigid with the carriage 4. The platen-frame therefore includes the journals 7 and 8 and supports the platen 5, which is vertically movable by means of a shift-key 10 and suitable intermediate connections for the purpose of disposing the platen at different elevations corresponding to the location of the upper and lower case characters on the type-bars.

Mounted on top of the frame 1 are ribbon-spools 11 and 12 for what may be termed the "primary" ribbon 13. The ends of the ribbon are wound upon the spools in an obvious manner, and at a point between the spools the ribbon is passed through a guide 14, having operative connection with the keys, so as to be raised from its normal depressed position to elevate the ribbon 13 opposite the printing-point as the type-bar advances toward the platen. This feature is a characteristic of front-strike or visible-writing machines, and the specific mechanism here shown is not my invention. The spools 11 and 12 are alternately operated positively from the keys to feed the primary ribbon, and so far as the present invention is concerned this feed may be effected by any well-known or approved form of ribbon-feeding mechanism—as, for instance, that which is indicated generally in Fig. 3 of the drawings. Indeed, it may be stated at this point that none of the various features of construction which have thus far been described are claimed as my invention, except in so far as they may enter into combination with certain other features to be hereinafter described—notably, provision for utilizing a single ribbon for the simultaneous production of a plurality of copies of the record or for producing such manifold record by the addition of one or more secondary ribbons which in connection with the usual or primary ribbon accomplish the same general result.

That embodiment of the invention which is shown in the first six figures of the drawings will be first described.

Extended forwardly from the journals 7 and 8 of the platen-shaft and vertically movable therewith are ribbon-spool-supporting brackets 15, supporting ribbon-spools 16 and 17, upon which are oppositely wound the ends of a secondary ribbon 18, extended across the platen opposite the printing-line and retained in its proper position by suitable ribbon-guides 19, extended from the brackets 15. The secondary ribbon 18 is designed to be interposed between two paper sheets or webs 20 and 21, the latter being interposed between the two ribbons, so that the several paper webs and the ribbons may be said to be disposed at right angles to each other and interwoven or in alternating arrangement.

In printing the type strikes the primary ribbon and impresses the latter upon the front web or sheet 20 to produce the original record, a duplicate record substantially as clear as the first or original record being produced upon the second sheet or web of paper 21 by the secondary ribbon 18. If desired, the rear side only of the secondary ribbon 18 may be inked, so as to avoid the possibility of producing characters on the back of the outer or primary work-sheet. The paper necessarily moves with the paper-carriage as the latter advances in the direction of letter-spacing or is retracted to begin a new line of writing, and in that embodiment of my invention shown in the first six figures of the drawings a secondary ribbon likewise moves with the carriage. It follows that while the secondary ribbon and the paper are held relatively stationary during the writing of a line the ribbon will nevertheless be advanced step by step, so that an unused portion thereof will be continuously presented at the printing-point. Thus during the printing of a line both the primary and secondary ribbons will be advanced, the primary ribbon being fed step by step from spool to spool and the secondary ribbon being advanced step by step with the carriage. It is desirable, however, to provide means for feeding the secondary ribbon from one spool to the other. It will be noted that if the feeding means of the secondary ribbon were fed step by step from the spool 17 to the spool 16 during the advance of the carriage to the left the actual feed of the ribbon relative to the printing-point would be two spaces at a time, one step or increment being effected by the movement of the ribbon from spool to spool and the other increment being simultaneously effected by the movement of the ribbon with the carriage. This would result in an unnecessary feed of the ribbon. On the other hand, if during the advance of the carriage to the left the secondary ribbon were fed step by step from the spool 16 to the spool 17 the same portion of the ribbon would be used continuously, because while the ribbon would advance one step to the left with the carriage it would advance one step to the right relative to the carriage, the result being no actual advance in either direction with respect to the printing-point. For the reasons stated it is preferable to provide no feed of the secondary ribbon from spool to spool during the letter-space movement of the carriage, since this movement of itself effects a bodily step-by-step advance or feed of the secondary ribbon relative to the printing-point. Having used a portion of the secondary ribbon corresponding in length to the length of the line written, it is desirable to displace this portion of the ribbon by a fresh or unused portion thereof. I have therefore devised ribbon-feeding means which operates automatically during the retraction of the paper-carriage to effect a comparatively extensive feed of the secondary ribbon from one spool to the other, sufficiently extensive, in fact, to displace the entire used portion of the ribbon or at least a substantial portion thereof.

The spools 16 and 17 are provided with depending shafts 22 and 23, each provided at its lower end with a head 24 and a reduced neck 25. The shafts are provided with feed-pinions 26 and 27, loosely revoluble upon the necks 25 and designed during certain periods of movement of the carriage to engage fixed racks 28 and 29. These racks are oppositely disposed, as shown in Fig. 4, and extend beyond opposite ends of the frame 1, to which they are rigidly secured by brackets 30. Fixed to the spool-shafts 22 and 23, above the feed-pinions 26 and 27, are ratchet-wheels 31 and 32, having their teeth disposed in opposite directions, as shown in Fig. 5, and arranged to be engaged by pawls 33 and 34, pivotally mounted on the adjacent pinions. Each pawl is urged toward its ratchet by a spring 35 and is provided with a catch 36, which may be engaged in a depression 38 in the upper face of the pinion to retain the pawl in an inactive position—that is to say, in a position in which it will not engage the ratchet. (See, for instance, the position of the pawl 34 in Fig. 5.) By reference to Figs. 4 and 5 it will be noted that when the carriage is moving to the left or in the direction of the arrows in said figures the pinions may engage the racks and rotate freely by reason of such movement in the direction of the full-line arrows on the pinions in Fig. 5 without rotating the spools, the pawl 33 clicking idly over the ratchet 31 during this movement and the pawl 34 being entirely out of contact with the ratchet 32. During the first part of the retractile movement of the carriage, however, the pinion 26, engaging the rack 28, will necessarily rotate in the opposite direction—to wit, that indicated by the dotted arrow in Fig. 5—and this movement will be imparted to the spool 16 by reason of the engagement of the pawl 33 with a tooth of the ratchet 31. Thus during the travel of the pinion 26 along the rack 28 the spool 16 will be rotated to wind the secondary ribbon 18 thereon, thus displacing either the entire used portion thereof or a substantial part of such portion from a position opposite the platen and presenting an unused portion of the ribbon simultaneously unwound from the spool 17, which will obviously rotate freely during the operation just described by reason of the pull on the ribbon. Thus during the printing of a line the secondary ribbon will be advanced step by step relative to the printing-point with the carriage, and during the retraction of the carriage a much greater feed of the ribbon relative to the platen will be effected. When the ribbon has been completely wound upon the spool 16, the ribbon-feed will be reversed by disengaging the pawl 33 from the ratchet 31 and releasing the catch 36 of the other pawl 34 to permit said pawl to engage the ratchet 32. Under these new conditions the feed-pinions will rotate idly during the forward movement of the carriage, the pawl 34 clicking idly over the ratchet 32. During the last part of the retractile movement of the carriage, however, the pinion 27 will rotate in the direction of the dotted arrow in Fig. 5, and the spool 17 will thus be rotated to wind the ribbon thereon in a manner similar to the winding of said ribbon on the spool 16, as already described. The only difference between the operation of the spools 16 and 17 is that the spool 16 is positively rotated to feed the ribbon to the left during the first portion of the retractile movement of the carriage, while the last portion of such retractile movement is utilized for the positive operation of the spool 17. It is possible by extending the racks inwardly to utilize the entire retractile movement of the carriage for the operation of the spools. This, however, is unnecessary, because the diameter of a ribbon-spool and the body of ribbon wound thereon is considerably greater than the diameter of the feed-pinion, and consequently the extent of the ribbon-feed will be considerably greater than the length of the rack by means of which the feed is effected. Furthermore, it is unnecessary under some conditions to extend the racks beyond the frame of the machine, as it is evident that where only a comparatively slight feed of the secondary ribbon is required—as, for instance, where a narrow paper strip is employed for writing a column of numbers, addresses, or other short lines—sufficient feed of the ribbon could be secured by locating the racks 28 and 29 or a single rack within the limits of the machine-frame.

As shown more particularly in Fig. 4, the racks 28 and 29 are of such dimensions that the pinions will not be disengaged therefrom when the platen is elevated for the printing of upper-case characters. This provision for the engagement of the pinions and racks in both the upper and lower case positions of the platen is not absolutely essential, but is desirable for the reason that in the event of disengagement of the pinions when the platen is elevated slight rotary movement of the pinions might prevent proper correlation of the parts to be reëngaged, and thus permit one or both racks to obstruct the downward movement of the platen upon the release of the shift-key.

In the broader aspects of the invention it is immaterial what character of work elements are employed, since it is obvious that the invention is primarily directed to manifold-printing and that it is equally adapted for producing manifold-records upon all kinds of work-sheets capable of being printed upon by machines of this character. When long webs or sheets of paper are employed, they may be led from any suitable source of supply, preferably, though not necessarily, provided with a holder or container of some character—as, for instance, one or more rolls supported either on or off of the machine. Inasmuch, however, as this invention is designed particularly to facilitate the making out of duplicate mailing-strips or long lists of names and addresses which when separated constitute address-labels, I provide at the back of the machine a paper-roll-supporting frame 39, in which are mounted spindles 40 and 41, supporting paper-rolls 20ª and 21ª, from which the paper-webs 20 and 21 are led opposite the platen. The frame 39 includes a pair of arms 42, extended forwardly and attached to the carriage 4, and in order to prevent the weight of the rolls and frame from causing binding of the carriage 4 in its guides said frame is provided at its lower front corner with rollers 43, which travel upon a track 44, secured to the rear side of the frame 1 and preferably extended beyond the opposite ends or sides of the frame, as shown in Fig. 2.

Obviously instead of mounting a series of paper-rolls on the frame 39 the several paper webs may be wound into a single roll supported by said frame or otherwise. It should also be noted in connection with this form of the invention that while it is desirable to locate the spools 16 and 17 of the secondary ribbon 18 beyond opposite ends of the platen, for the reason that a work element as wide as the platen is long may thus be accommodated, such arrangement is not essential, since it is only necessary that the straight horizontal portion or section of the ribbon 18, which is located in the plane of the line of writing, shall be of sufficient length to accommodate the particular work-sheet to be used. Therefore if, as in the present instance, the use of narrow paper sheets or strips is contemplated the spools 16 and 17 may be mounted much closer together than in the illustrated construction.

Another peculiarity of the described arrangement may also be pointed out. In type-writing machines of the "visible-writing" type, so called, the entire line of writing is exposed to view except when actually printing, and even then only such portion of the line is obscured as is necessary to present a short section of the ribbon in the plane of the line of writing or opposite the printing-point. For this reason the ribbon is mounted at a point or points remote from the plane of the line of writing, and a short section of the ribbon usually located between two spools is intermittently presented opposite the printing-point or in the plane of the line of writing by means of a comparatively narrow-ribbon-guiding device, including a set of ribbon-guides spaced comparatively close together. In the illustrated construction the guiding device 14 rises and falls in a manner well understood in the art, and the fingers of said device constitute the set of ribbon-guides to which reference has just been made, it being observed by reference to Fig. 1 that between these guides is located a short straight section of the ribbon 13, which section is located in the plane of the line of writing during the actual printing operation. This ribbon-section, while sufficient to transfer the impression of the type to the paper, is insufficient to obscure any considerable portion of the line of writing, even when raised to its elevated position opposite the printing-point.

With the secondary ribbon 18 the conditions are entirely different. This ribbon, like the primary ribbon 13, must of necessity have a straight section thereof disposed in the plane of the line of writing, and this straight section must be at least coextensive in length with the line to be written, since it bears a fixed relation to the paper during the writing of a line and must necessarily be located opposite each portion of the paper to which an impression is to be transferred by it. Thus it would seem that in equipping a visible-writing type-writer with a manifolding-ribbon mechanism it is desirable, if not essential, to provide at least two ribbon-sections, whether parts of the same or of separate ribbons, which sections are of different lengths and disposed during the printing operation in the plane of the line of writing to simultaneously produce a plurality of impressions of the character printed, one ribbon-section being at least as long as the line to be written and the other section being shorter than the line of writing in order to leave at least a portion of the latter unobscured.

As a corollary of the foregoing proposition it would also seem that it is desirable, if not essential, to include as elements of a manifold ribbon mechanism for visible-writing typewriters at least two sets of ribbon-guides, the guides of one set being spaced farther apart than the guides of the other set, the guides of each set accommodating between them a straight section of ribbon comparatively long or short, according to the wide or narrow spacing of the guides. The term "guides" as thus used is to be construed broadly—so broadly, in fact, as to include ribbon-spools without the addition of other ribbon-guiding instrumentalities, since it is evident that these ribbon-sections of different lengths might be extended directly between ribbon-spools, which, without addition, would constitute terminal guides for the active ribbon-sections.

In Figs. 7 and 8 is shown another embodiment of my invention. In this form the opposite ends of both the primary and secondary ribbons 13 and 18 are wound upon the same spools 11 and 12, the secondary ribbon being led around guide-rollers $18^a$ and $18^b$, carried by brackets $18^c$, secured to and extended outwardly from the opposite sides of the frame 1. This arrangement of the rolls is adopted in order to present an extensive portion of the ribbon 18 parallel with the platen and in the plane of the line of writing, and the extension of this portion of the ribbon beyond the opposite ends of the frame is desirable, since in this instance the paper and platen move along the secondary ribbon, the straight or active portion or section of which must be of sufficient length to accommodate the travel of the paper with the platen. Of course where, as in the present instance, a very narrow paper web is employed a very limited travel of the platen is necessary, and for that reason the extension of the secondary ribbon might be materially diminished. In fact, if the paper is quite narrow the brackets $18^c$ may not only be materially shortened, but may even be omitted entirely and the ribbon-guides located within the limits of the machine-frame, as it is only necessary that the straight portion or section of the ribbon 18 shall be of sufficient length to permit the paper to travel along it during the printing of a line. This necessary length of the straight ribbon-section is approximately equal to the width of the paper plus the length of the line of writing, assuming that the ribbon is mounted on the machine-frame, as distinguished from the carriage, and that the ribbon-spools are mounted in advance of the paper. The arrangement shown, however, permits the use of paper webs considerably wider than those illustrated. In this form of the invention the ribbons are simultaneously fed step by step in the manner in which a single ribbon is ordinarily advanced from spool to spool.

In Figs. 9 and 10 still another form of the invention is shown. In this case the spools 11 and 12 for the primary ribbon are provided with gear-wheels $a$, which mesh with similar gear-wheels $b$, carried by separate spools $16^a$ and $17^a$ for the opposite ends of the secondary ribbon 18. In this construction, as in that previously described, the ribbon 18 is led from the spools around guide-rollers $18^d$ and $18^e$ to present the active portion of the ribbon in proper relation to the platen, as heretofore described. As shown in Fig. 9, the guide-rollers, together with the spools $16^a$ and $16^b$, are mounted on brackets $c$, secured to the opposite sides of the frame 1. It will of course be understood that in both the construction shown in Figs. 7 and 8 and that shown in Figs. 9 and 10 that portion of the secondary ribbon lying between the guides 19 will be elevated by said guides when the platen is shifted preparatory to the printing of an upper-case character.

In Fig. 11 is shown a variation which corresponds with the construction shown in the first six figures, except that an additional secondary ribbon $18^x$ is interposed between the ribbons 13 and 18 and has its opposite ends wound upon spools $16^b$ and $17^b$, mounted on extensions $15^a$ of the brackets 15, and except, further, that the spools 16 and 17 are provided with gear-wheels $d$, meshing with similar gear-wheels $e$ on the spools $16^b$ and $17^b$. Since the spools of the respective secondary ribbons 18 and $18^x$ necessarily rotate in opposite directions in view of the direct gearing thereof, the corresponding ends of these ribbons are necessarily oppositely wound. In this last-described form of the invention provision is obviously made for three copies of the record. Three paper webs are utilized, one being led between the platen and the ribbon 18, the next being led between the two secondary ribbons 18 and $18^x$, and the third being carried upwardly between the ribbons $18^x$ and 13. In this case the three webs may be led from any suitable source of supply, preferably either a single roll into which all three webs are wound or three separate rolls, for the accommodation of which the paper-roll frame may be modified. The operation of the ribbon mechanism shown in Fig. 11 is precisely the same as that described in connection with the first form of the invention, (shown in Figs. 1 to 6,) the two secondary ribbons operating simultaneously precisely as the single secondary ribbon operates in said first-described construction.

In Figs. 12 and 13 is shown an embodiment of the invention which comprehends the employment of a single endless ribbon 13$^a$, coiled upon a ribbon spool or holder 13$^b$ and having a looped portion guided by ribbon-guides 13$^c$, 13$^d$, and 13$^e$. Between the guides 13$^c$ extends a comparatively long straight ribbon-section $x$, located in the plane of the line of writing and designed to transfer the impression of the printed character to the second or inner sheet or web of paper. A second and somewhat shorter straight ribbon-section $y$ extends between the guides 13$^d$, which in this case are the fingers of the ribbon-guiding device 14. This section $y$ when raised by the guide 14 is disposed opposite the printing-point. In other words, it is then located, like the section $x$, in the plane of the line of writing, so that impressions of the character printed will be simultaneously transferred by the ribbon-sections $y$ and $x$ to the outer and inner sheets or webs, respectively. It might be practicable to lead the ribbon directly from the guides 13$^d$ to the left-hand guide 13$^c$; but in order to expose as much of the line of writing as possible it is preferable to provide an additional guide 13$^e$, located at some distance in advance of the left-hand guide 13$^c$. By this arrangement both of those portions of the ribbon which extend beyond opposite sides of the short section $y$ are removed from close proximity to the paper, so that the only part of the latter which is obscured by the ribbon during the printing operation is that point located directly at the printing-point and covered by the short section $y$. In this instance the feed of the ribbon may be effected in any one of several ways—as, for instance, by rotating the holder or spool 13$^b$ in a manner similar to the operation of the primary ribbon-spools in the construction first described.

An idea generic to all of the disclosed forms of the invention is the simultaneous production of two or more impressions of the character printed by means of two or more ribbon-sections, whether of the same or of different ribbons, located in the plane of the line of writing during the printing operation and of different lengths, one section being at least as long as the line of writing and the other shorter than the line of writing.

Another generic feature is the provision of separate sets of ribbon-guides, the members of one set being spaced farther apart than the members of another set, so that the ribbon-sections accommodated by the respective sets of guides and extending between the members thereof will be of different lengths.

While I have illustrated a number of forms of ribbon mechanism, to all of which my invention is generic, it is evident that further variations may be effected. For instance, where more extensive manifolding is desired either the frame or the carriage of the machine may be equipped with a larger number of ribbons than has been shown, such variation merely requiring an extension of the disclosed arrangement—that is to say, the mounting of a larger number of ribbons on the spools or the provision of additional spools when it is desired that each ribbon shall be wound upon spools appropriated to it alone, or where a single endless ribbon is employed additional copies may be provided for by training the looped portion of said ribbon back and forth between additional guides to secure additional active ribbon-sections. Furthermore, the several records may be produced in different colors by employing ribbons of different colors or a single ribbon having different-colored sections.

I wish it to be distinctly understood that I do not make claim in this application to the mechanism of the type-writing machine proper, the present invention being directed solely to the production of ribbon mechanism by means of which manifold records may be simultaneously produced. It should also be understood that while the several ribbon mechanisms shown are embraced within the spirit of the invention and fall within the scope of certain generic claims presented the form disclosed in the first six figures of the drawings is the only one specifically claimed herein.

It is thought that from the foregoing the construction and operation of the several illustrated embodiments of my manifolding ribbon mechanism will be clearly comprehended; but I desire to be understood as reserving the right to effect such changes, modifications, and variations of the illustrated structures as may come fairly within the scope of the protection prayed.

What I claim is—

1. In a type-writing machine, the combination with a frame, printing mechanism, platen, and platen-carriage, of a plurality of ribbon-sections disposed longitudinally of the line of writing and arranged in opposed relation to simultaneously transfer a type impression to a plurality of paper sheets alternating with said ribbon-sections, and feeding mechanism common to said ribbon-sections.

2. The combination with the movable carriage of a type-writing machine, of a plurality of inking-ribbons mounted on and movable with the carriage and disposed in superposed relation at the printing-point to permit their disposal in alternating arrangement with a plurality of work elements.

3. The combination with the movable paper-carriage of a type-writing machine, of a plurality of inking-ribbons mounted on the carriage and arranged to simultaneously transfer a type impression to a plurality of paper sheets alternating with the ribbons, ribbon-spools for said ribbons, and means for rotating the spools to feed the ribbons relative to the carriage.

4. The combination with the movable paper-carriage of a type-writing machine, of separate ribbons mounted on the carriage and arranged to simultaneously transfer a type impression to a plurality of paper sheets alternating with the ribbons, and separate sets of spools for said ribbons.

5. The combination with the movable paper-carriage of a type-writing machine, of separate ribbons mounted on the carriage, and separate sets of spools for said ribbons, a spool of one set being geared to a spool of another set.

6. In combination with the movable paper-carriage of a type-writing machine, a plurality of ribbons mounted on the carriage and arranged to simultaneously transfer a type impression to a plurality of paper sheets alternating with the ribbons, separate sets of ribbon-spools for the ribbons, and operating mechanism common to the several spools.

7. The combination with the frame, printing mechanism and movable paper-carriage of a type-writing machine, of a plurality of ribbons extending across the carriage opposite the printing-point and arranged to simultaneously transfer a type impression to a plurality of paper sheets alternating with the ribbons, and feeding mechanism common to said ribbons.

8. The combination with the frame, printing mechanism, and traveling paper-carriage of a type-writing machine, of a plurality of inking-ribbons, one of said ribbons being mounted on the frame of the type-writing machine and a plurality of said ribbons being mounted on and movable with the paper-carriage the several ribbons being arranged to simultaneously transfer a type impression to a plurality of paper sheets alternating with the ribbons.

9. The combination with the movable paper-carriage of a type-writing machine, of a plurality of inking-ribbons disposed lengthwise of the carriage and arranged to simultaneously transfer a type impression to a plurality of paper sheets alternating with the ribbons, and means for simultaneously feeding said ribbons when the carriage is retracted.

10. The combination with the movable paper-carriage of a type-writing machine, of a plurality of inking-ribbons mounted on and movable with the carriage and arranged to simultaneously transfer a type impression to a plurality of paper sheets alternating with the ribbons, and means for automatically effecting the simultaneous feed of said ribbons during the retraction of the carriage.

11. In a type-writer, the combination with a frame, a movable carriage, a platen movable with the carriage, and printing mechanism mounted on the frame, of manifolding mechanism including a plurality of ribbon-sections disposed opposite the line of writing during the printing operation, and ribbon-feeding mechanism including a spool, a rack and intermediate gearing.

12. In a type-writing machine, the combination with a frame, a movable carriage, a platen movable with the carriage, and printing mechanism mounted on the frame, of manifolding mechanism including a plurality of ribbon-sections disposed opposite the line of writing during the printing operation, ribbon-feeding mechanism including a ribbon-spool mounted on the carriage, a rack mounted on the machine-frame, and gearing between the rack and spool.

13. In a type-writing machine, the combination with the frame and printing mechanism mounted thereon, the movable carriage and the platen movable therewith, of ribbon-spools movable with the carriage, a ribbon extended between the spools, a pair of fixed racks mounted on the machine-frame, and gearing effecting a coöperative relation between each spool and one of the racks.

14. In a type-writing machine, the combination with a frame and a movable carriage, of a ribbon mounted on the carriage, and means for feeding said ribbon during the retraction of the carriage to begin a new line of writing, said ribbon-feeding means including a spool, a rack, and interposed gearing.

15. In a type-writer, the combination with a frame, a movable carriage, a platen, printing mechanism, line-spacing mechanism, and a ribbon, of means independent of the platen and line-spacing mechanism for feeding the ribbon in either direction during the retraction of the carriage to begin a new line of writing.

16. In a type-writing machine, the combination with a platen and printing mechanism, of a plurality of ribbons, and separate sets of spools for said ribbons, a spool of one set being geared to a spool of another set.

17. In a type-writing machine, the combination with a frame and printing mechanism mounted thereon, of a movable carriage, a platen movable therewith, a plurality of ribbons mounted on the carriage and disposed opposite the line of writing at the same time, and means independent of the platen for effecting the simultaneous feeding of the ribbons.

18. In a type-writing machine, the combination with a frame, printing mechanism mounted thereon, a movable carriage, and a platen movable therewith, of a plurality of ribbons mounted on the carriage, a ribbon mounted on the frame, all of said ribbons being disposed in the plane of the line of writing during the printing operation, and means independent of the platen for feeding the ribbons mounted on the carriage.

In testimony that I claim the foregoing as my own I have hereto affixed my signature in the presence of two witnesses.

HIRAM J. HALLE.

Witnesses:
CHAS. FLINT,
H. R. VAN DEUCER.